United States Patent [19]

Jinno et al.

[11] Patent Number: 5,565,749
[45] Date of Patent: Oct. 15, 1996

[54] METHOD OF CONTROLLING A GRINDER ROBOT

[75] Inventors: Makoto Jinno, Tokyo; Takashi Yoshimi, Kanagawa-ken, both of Japan

[73] Assignee: Kabushiki Kaisha Toshiba, Kawasaki, Japan

[21] Appl. No.: 233,876

[22] Filed: Apr. 26, 1994

[30] Foreign Application Priority Data

Apr. 28, 1993 [JP] Japan ................................. 5-102038
Apr. 28, 1993 [JP] Japan ................................. 5-102039

[51] Int. Cl.$^6$ .................................................. B24B 49/00
[52] U.S. Cl. ............... 318/566; 318/568.17; 364/474.06
[58] Field of Search ................................. 318/560–570, 318/590–592; 364/474.01, 474.02, 474.06, 474.32, 474.33, 474.34; 451/5, 11, 21, 901

[56] References Cited

U.S. PATENT DOCUMENTS

| | | | |
|---|---|---|---|
| 4,467,432 | 8/1984 | Imazeki et al. ................... | 364/474.03 |
| 4,524,547 | 6/1985 | Heaston et al. . | |
| 4,666,352 | 5/1987 | Nagao et al. ..................... | 364/474.06 |
| 4,739,489 | 4/1988 | Kishi et al. ....................... | 364/474.06 |
| 4,745,558 | 5/1988 | Kishi et al. ....................... | 364/474.06 |
| 4,963,805 | 10/1990 | Suzuki et al. ..................... | 318/569 |
| 5,095,440 | 3/1992 | Suzuki et al. ..................... | 364/474.33 |
| 5,119,595 | 6/1992 | Ushiyama et al. . | |
| 5,126,645 | 6/1992 | Yoshimi et al. . | |
| 5,173,863 | 12/1992 | Martin ............................... | 364/474.06 |
| 5,254,923 | 10/1993 | Kanitani ........................... | 318/568.11 |
| 5,255,200 | 10/1993 | Torizawa et al. ................. | 364/474.22 |
| 5,265,195 | 11/1993 | Jinno et al . | |
| 5,299,389 | 4/1994 | Yonaha et al. . | |
| 5,315,789 | 5/1994 | Takashi ............................. | 364/474.06 |

FOREIGN PATENT DOCUMENTS 5-31666  2/1993  Japan .

OTHER PUBLICATIONS

IEEE International Workshop on Intelligent Robots and System 1990 "Force Controlled Robot for Grinding" K. Kashiwagi et al; Jul. 1990.

Primary Examiner—Brian Sircus
Attorney, Agent, or Firm—Oblon, Spivak, McClelland, Maier & Neustadt, P.C.

[57] ABSTRACT

This invention is directed to a method of controlling a grinder robot wherein a grinder is mounted at a tip of a robot finger, and a grinding operation is performed in respect of a prescribed grinding region of a work while controlling the pressing force of the grinder. The force control is exercised such that the pressing force of the grinder is made smaller as the grinder approaches a vicinity of a boundary of the grinding region.

19 Claims, 13 Drawing Sheets

$Pi(X \cdot xi, 0, Zt(i-1)+Za)$
$P(i+1)(Xpx(i+1), 0, Zti+Za)$

METHOD OF CONTROLLING A GRINDER ROBOT

BACKGROUND OF THE INVENTION

1. Field of the Invention

This invention relates to a method of controlling a grinder robot. In more detail, the present invention relates to a method of controlling a grinder robot wherein a grinder is mounted at a tip of a robot finger, and a grinding operation is performed on a work surface while controlling a pressing force of the grinder with respect to the work surface.

2. Description of The Background Art

Grinder robots are known in which a grinding tool such as a grinder is mounted at a tip of a robot finger, and a grinding operation is performed while pressing this grinder against a work of an arbitrary shape with a prescribed force. Specific examples of such grinder robots are illustrated in U.S. Pat. No. 5,126,645 and U.S. Pat. No. 5,265,195, etc.

In a grinding operation performed by such a grinder robot, the pressing force of the grinder against the work is detected by a six-axis force/torque sensor mounted at the tip of the robot arm, and the target position and attitude of the grinder are successively corrected while successively comparing this detected pressing force with a target pressing force, thereby controlling the target pressing force so that it is maintained constant.

Thus, while using such a control method, for example as shown in FIG. 1, the grinder is progressively fed in the X direction while performing a plurality of reciprocations over the grinding region of the work. As a result, a smooth surface condition can be produced over the grinding region.

However, in a conventional grinder robot controlled as described above, in cases where a grinding operation is performed that has to grind a work surface in which a comparatively large number of burrs and/or irregularities are present before grinding, there is a high probability of the following problems occurring.

The first problem is that, when a work surface in which comparatively large irregularities are present has to be ground smooth, a step (groove) is formed along the boundary of the grinding region on the work surface after grinding.

Formation of such a step risks giving rise to stress localization at the step portion. If a large force is applied to such a work, stress concentration occurs in the vicinity of the step, leading to the formation of cracks from the vicinity of the step.

Furthermore, since the step formed by the conventional grinding operation is formed at right angles when seen in the cross-sectional plane of the work, it is fairly sharp, and thereby presents a risk of scratching other works, etc., coming into proximity with it. In particular, such steps are often formed in a straight line along the grinding boundary.

A second problem is that, when grinding smooth comparatively large burrs and/or irregularities present in the work surface, as shown in FIG. 1, the grinder 11 may be damaged when moving in the A direction.

Specifically, whereas, when grinder 11 is moved in the B direction (retracted), the edge of the grindstone is dragged over the surface of the work. When grinder 11 is moved in the A direction (advanced), however, the edge of the grindstone moves in such a way that it can snag on the work. In this latter case therefore it sometimes happens that the presence of comparatively large burrs and/or irregularities in the work surface make grinding of the burrs and/or irregularities impossible, because they prevent movement of the grindstone. In some cases there is even a risk of the grindstone and work, or the grinder robot itself, being damaged.

Consequently, in order to avoid this problem, the method was adopted of only performing the grinding operation by pressing the grindstone against the work while the grinder is being retracted in direction B; whereas while the grinder is being advanced in direction A, it is moved up to the line Y=0 through the space above the work without performing a grinding operation. However, with the method in which the grinder is moved in the direction A through the space above the work, difficulty is experienced in accurately guiding and returning the grinder to the correct position for recommencement of the grinding operation. This is because it is not possible to make use of force control, since when the grinder is being guided and returned, grinding is not being performed.

Even if the grinder were to be guided to a point on the boundary (Y=0, Z>0) of the grinding region using position control, usually, due to variability of the position of fixing of the individual work, the relative position of the work with respect to the grinder robot would not always be fixed. There would therefore be a risk of the grinder being guided too far away from the work, or alternatively, of the grindstone of the guided grinder colliding with the work, and thereby damaging the work.

SUMMARY OF THE INVENTION

Accordingly, one object of the present invention is therefore to provide a novel method of controlling a grinder robot wherein the problems arising in grinding smooth comparatively large burrs and/or irregularities present in a work surface before grinding can be overcome.

The invention of this application comprises a method of controlling a grinder robot wherein a grinder is mounted at a tip of a robot finger, and a grinding operation is performed in respect of a prescribed grinding region of a work while controlling a pressing force of the grinder, so that when the grinder approaches a vicinity of a boundary of the grinding region, force control is exercised such as to make the target pressing force smaller.

As a further feature, the invention of this application comprises a method of controlling a grinder robot wherein a grinder is mounted at a tip of a robot finger, and a grinding operation is performed a plurality of times in respect of a prescribed grinding region of the work while controlling the pressing force of the grinder, a grinder guide line is calculated from a point of contact obtained by bringing the grinder into contact with the work, and control is exercised so as to start the grinding operation of the work from a position on the grinder guide line.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
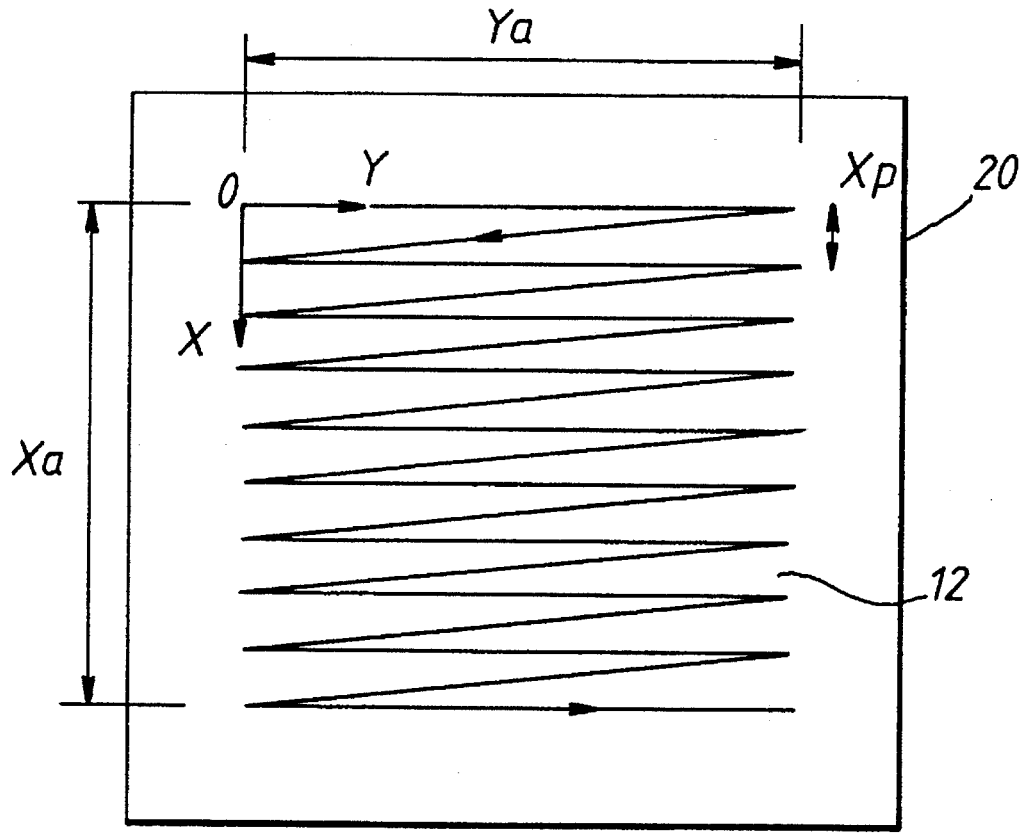
FIGS. 1(a) and 1(b) are views given in explanation of the grinding operation according to a prior art grinder robot control method.
Figure 1B:
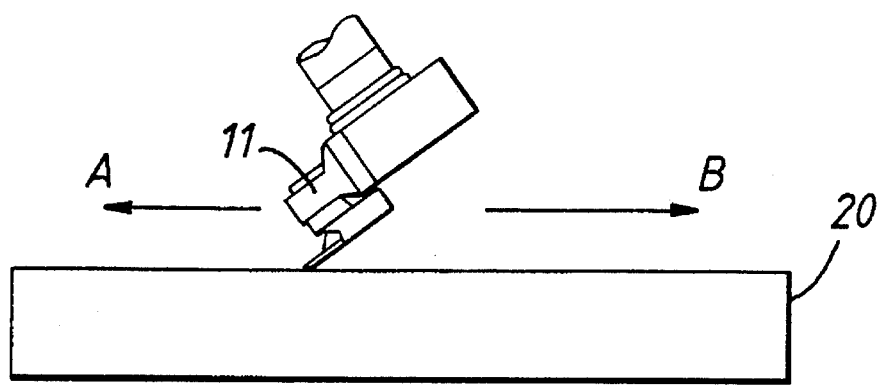

Referring now to the drawings, wherein like reference numerals designate identical or corresponding parts throughout the several views, and more particularly to FIGS. 2–9 thereof, there is shown a first embodiment of a method of controlling a grinder robot according to the invention of this application.

Figure 2:
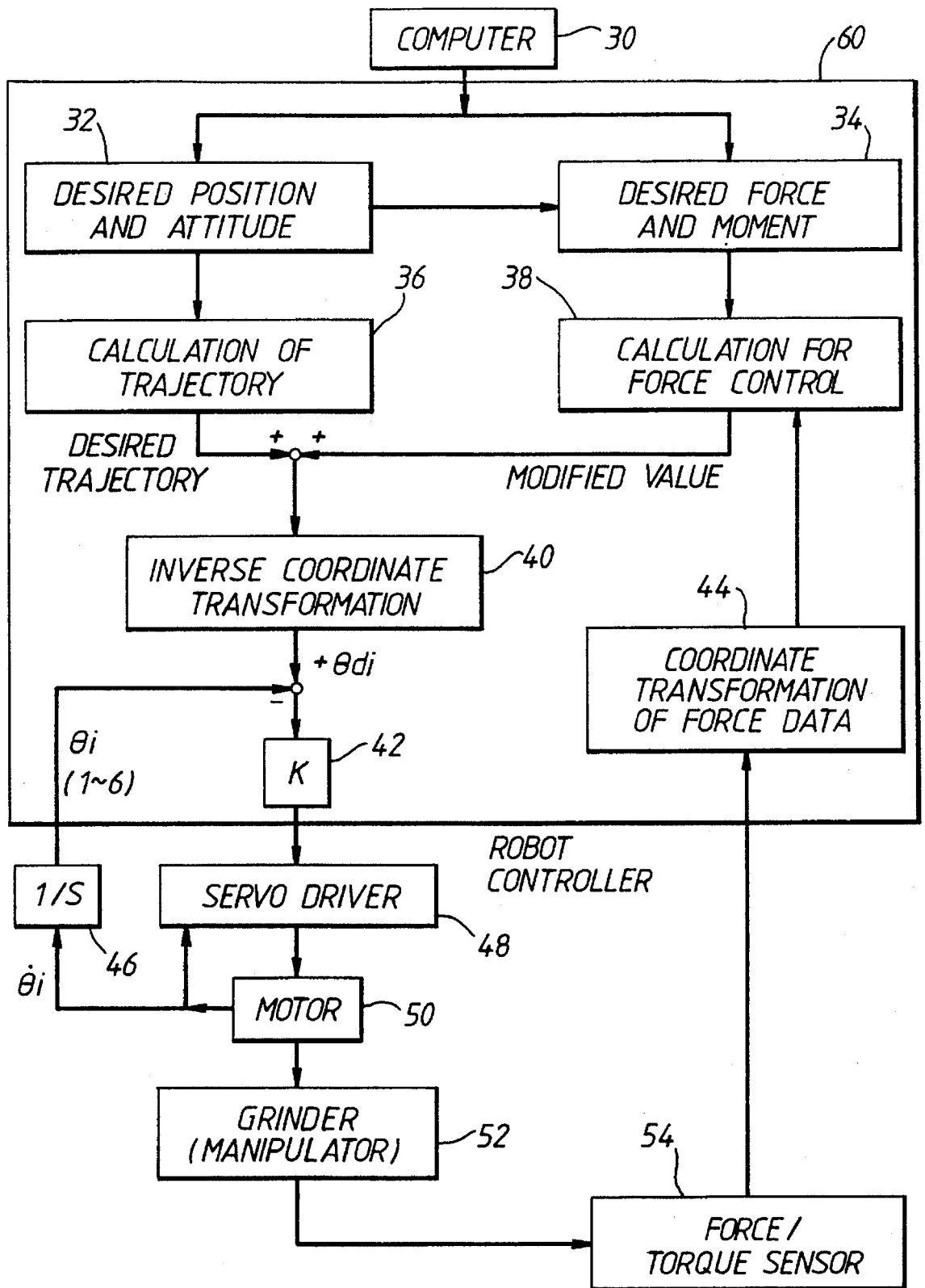
FIG. 2 is a block diagram of the control layout illustrating a first embodiment of the method of controlling a grinder robot according to the invention of this application.
Figure 3:
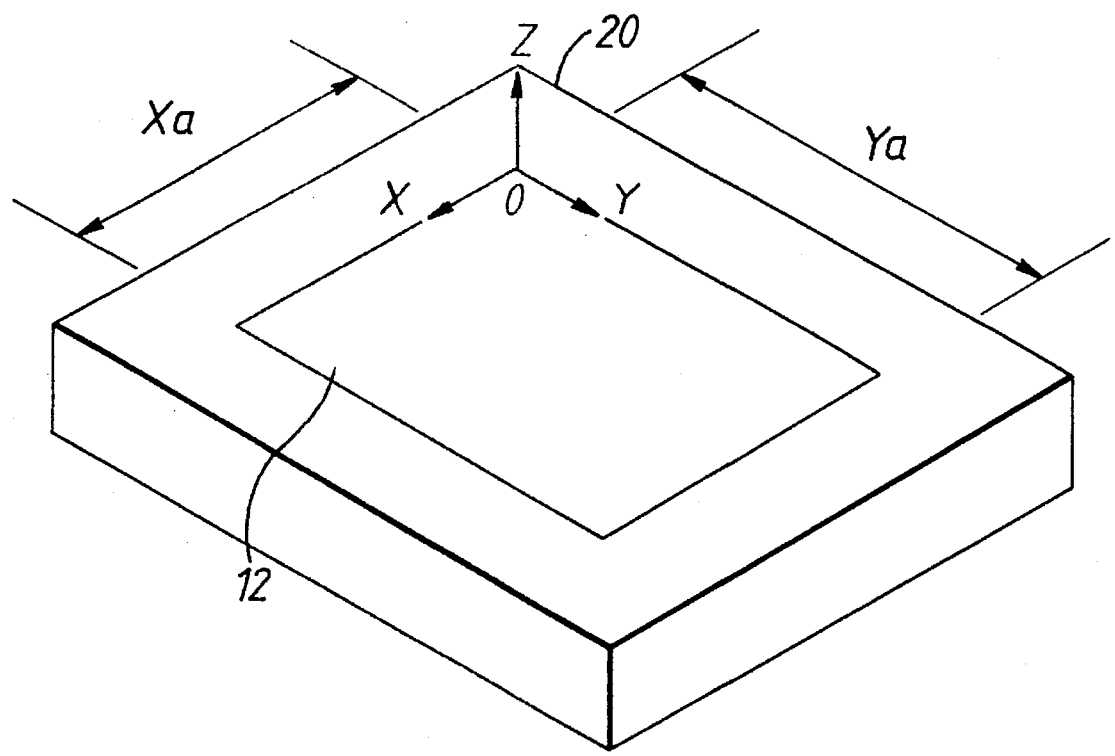
FIG. 3 is a perspective view showing an example of a work which is the subject of a grinding operation.

FIG. 2 shows the control layout of a grinder robot according to the present invention. As illustrated in FIG. 3, the control system may be constituted such that the Grinder Robot (Manipulator) 52 is controlled by Robot Controller 60 by a feedback loop. In this case, Grinder Robot (Manipulator) 52 may have six joints and six degrees of freedom.

First of all, the target position and attitude, and the target force and moment are inputted as Desired Position and Attitude 32 and Desired Force and Moment 34 data. These signals may be inputted from Computer 30 by an operator. The target pressing force of the grinder on the work can be varied in accordance with grinder position, so that the Desired Force and Moment 34 is changed by the Desired Position and Attitude 32.

Basically, the target track for the grinding operation is calculated as Calculation of Trajectory 36, which is generated by the final values of Desired Position and Attitude 32 of the grinder. On the other hand, the Desired Force and Moment 34 is utilized for the Calculation for Force Control 38.

The desired trajectory from the Calculation of Trajectory 36 and the modified value from the Calculation for Force Control 38 are then added together and the target rotation degree of each joint ($\theta di$) of the grinder robot is calculated by Inverse Coordinate Transformation 40 from this target track. Inverse Coordinate Transformation 40 transforms the position and attitude by the absolute coordinate into the position and attitude of grinder coordinate (i.e., sylindrical coordinate).

A feedback loop of position ($\theta i$) and feedback loop of velocity ($\dot\theta i$) are constituted as illustrated in FIG. 2. The target position of each axis of the grinder robot $\theta di$ is amplified by K 42 and transferred to Servo Driver 48. Servo Driver 48 outputs control signals to Motors 50 to drive each joint of Grinder Robot 52. Also, rotation velocity of Motors 50 is detected by velocity sensors (not shown) and are fedback to the Servo Driver 48. The rotation velocity ($\dot\theta i$) is integrated by time to produce rotation degree ($\theta i$) to modify $\theta di$.

Force/Torque Sensor 54 is fixed to the vicinity of the Grinder 52, so when the Grinder 52 is operated and contacts the work, the pressing force is detected by the Force/Torque Sensor 54. The detected pressing force is generated by grinder coordinate, so that Coordinate Transformation of Force Data 44 is needed to transform to absolute coordinate data. The transformed data is fedback to Calculation for Force Command 38 to modify given force data.

As noted above, it is possible to arrange that the target values of position and attitude of the grinder and/or the target values of the force and moment, or designation of the shape of the work and/or of the boundary position of the grinding region of the work, can be input through a computer terminal 30. Data of various types regarding the target pressing force can also be input, as shown in FIG. 4 to FIG. 9.

In implementing the present invention the robot construction and basic method of force control described in the above-mentioned U.S. Pat. No. 5,265,195 are adopted, which disclosure thereof is incorporated by reference, detailed explanation of this aspect will therefore be omitted in the following description.

Next, as an example in which the target pressing force of the grinder is varied depending on grinder position, an example is illustrated in which the target pressing force of the grinder is a function of the position of the grinder in the grinding region.

For example, the case will be described in which a rectangular grinding region 12 defined by $Y=0$, $Y=Ya$, $X=0$, $X=Xa$, on a work 20 as shown in FIG. 3 is established, and a grinding operation is performed by feeding the grinder gradually in the X direction while reciprocating a plurality of times in the Y direction.

Figure 4:
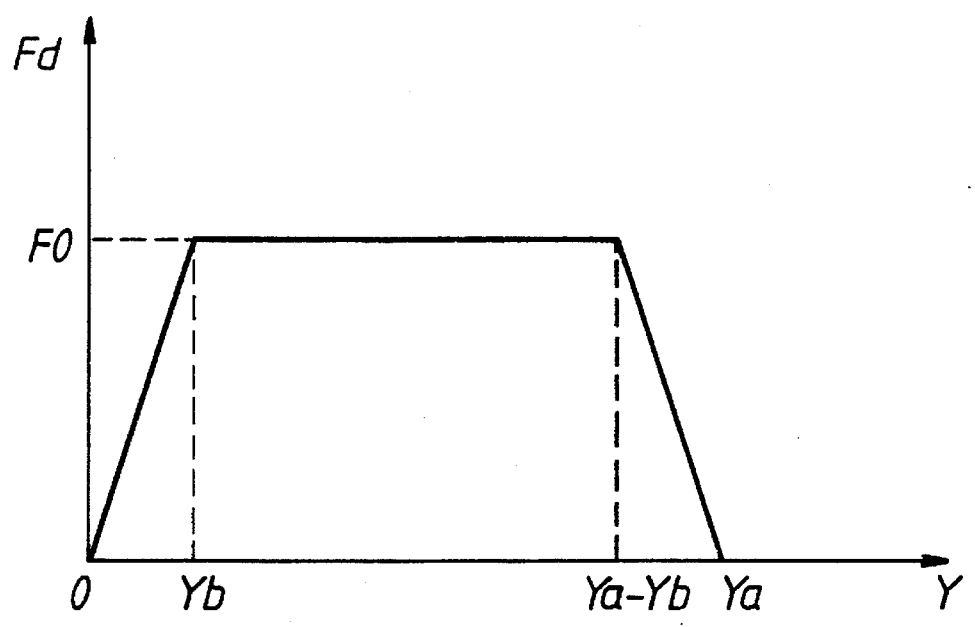
FIG. 4 is a graph showing an example of the target pressing force applied to the grinder according to the present invention.

First of all, the target pressing force Fd supplied to the grinder is set as shown for example in FIG. 4. Specifically, whereas the target pressing force in the range $Yb \leq Y \leq (Ya-Yb)$ is Fd=F0, the target pressing force Fd in the ranges $0 \leq Y \leq Yb$ and $(Ya-Yb) \leq Y \leq Ya$, i.e., in the vicinity of the boundary of grinding region 12, is set to be smaller than F0.

More specifically, the target pressing force Fd is increased linearly from 0 to F0 after the commencement of movement of the grinder, i.e. from $0 \leq Y \leq Yb$. Then, after the target pressing force has reached fixed value F0, before termination of grinder movement, i.e. from $(Ya-Yb) \leq Y \leq Ya$, the target pressing force Fd is linearly reduced from F0 to 0.

Figure 5A:
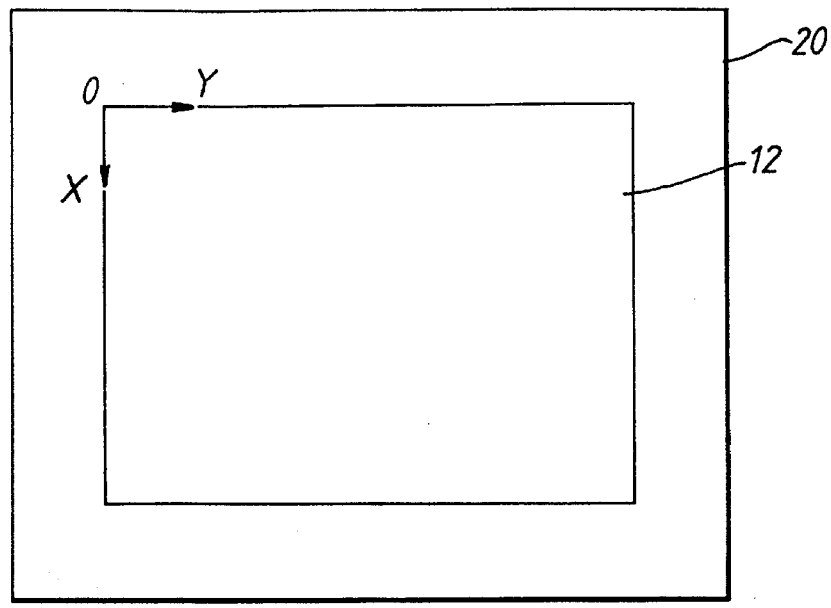
FIG. 5 shows a front view and plan view illustrating a work that is ground by the target pressing force of FIG. 4.
Figure 5B:
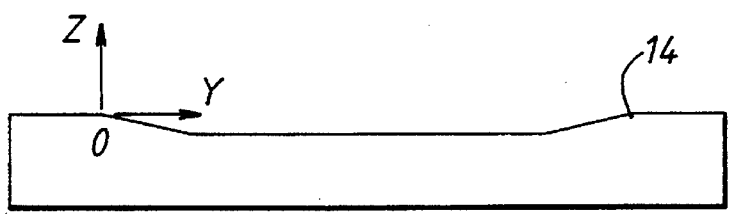

If the grinding operation is performed under such force control, work 20 is finished to a shape as shown in FIGS. 5(a) and 5(b). Specifically, the inside of boundary 14 of grinding region 12 of work 20 is ground in a tapered fashion in the Z direction, and is finished smoothly as one proceeds from the boundary towards the center. A step (groove) such as is produced conventionally is not therefore formed and the risk of stress concentration occurring in work 20 can be reduced to a minimum, and a finishing shape is produced in which cracking is very unlikely. Also, even if this work 20 is brought into contact with other works, since it does not have a step, there is no risk of scratching the other works.

The value F0 of the target pressing force Fd and the range Yb of increase or decrease of acceleration/deceleration can of course be suitably set depending on the purpose of the grinding operation and the shape which is to be produced on finishing.

Furthermore, it is not necessary for the period of acceleration/deceleration of the feed action of the grinder and the period of increase/decrease of the target pressing force to be the same. Also, the target speed pattern for the grinder feed action can be suitably set, being given by a graph shape such as for example a stepped shape, trapezoidal shape, or quadratic curve.

Figure 6:
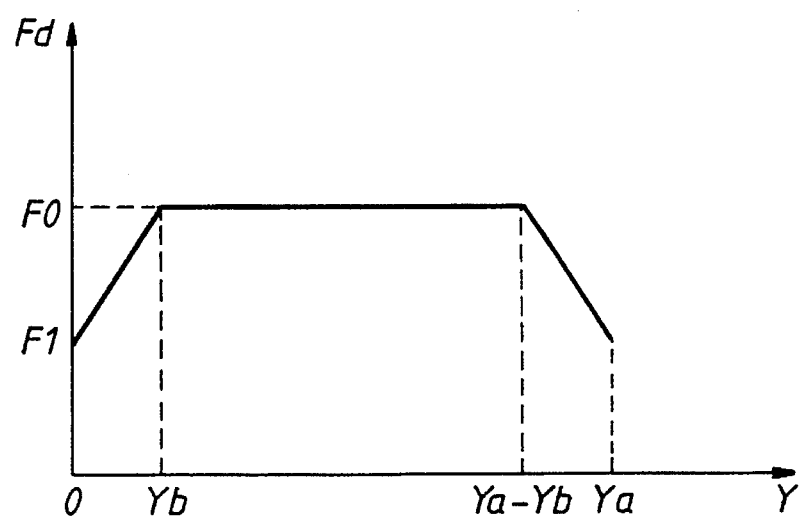
FIG. 6 is a graph showing another example of the target pressing force applied to the grinder according to the present invention.

Next, further examples of the function to be applied to the target pressing force applied to the grinder as in the present invention will be discussed with reference to FIG. 6 to FIG. 8. FIG. 6 shows the case where the grinding operation is performed with a pressing force varying from F1 to F0. At Y=0, Fd=F1 and increases from F1 to F0 at Y=Yb. From Yb to (Ya−Yb), Fd=F0. From (Ya−Yb) to Ya, Fd decreases from Fo to F1. When the pressing force is set in this way, it might be imagined that a step would be formed to some extent at the boundary of the grinding region. However, since any such step is much smaller in the Z direction than the step that is formed by the conventional method, the risk of cracking of the work is very greatly reduced, so there is a considerable practical benefit.

Figure 7:
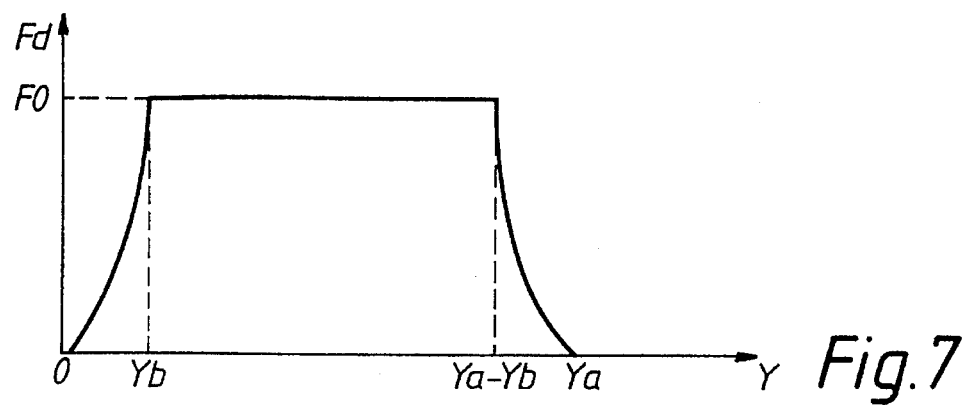
FIG. 7 is a graph showing another example of the target pressing force applied to the grinder according to the present invention.

FIG. 7 shows the case where the grinder pressing force in the ranges $0 \leq Y \leq Yb$ and $(Ya-Yb) \leq Y \leq Ya$ is defined by a quadratic curve. In this example, the inner neighborhood of the boundary of the grinding region can be finished in an extremely smooth manner, so stress concentration in this area can be very greatly reduced.

Figure 8:
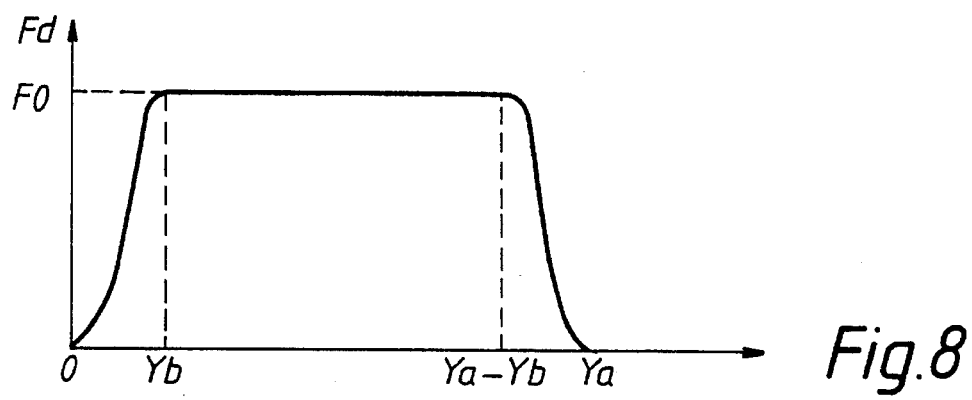
FIG. 8 is a graph showing another example of the target pressing force applied to the grinder according to the present invention.

FIG. 8 is an example in which the grinder pressing force in the ranges $0 \leq Y \leq Yb$ and $(Ya-Yb) \leq Y \leq Ya$ is defined by a triangular function. In this example, an extremely smooth finishing of the work can be obtained not only in the inner neighborhood of the boundary of the grinding region, but also in the area Y=Yb, Y=(Ya−Yb), so it is possible to practically eliminate the occurrence of stress concentrations.

Thus, with the present invention, the same effect can be obtained by setting the target pressing force of the grinder at Y=0 and Y=Ya to become smaller than the target pressing force of the grinder at arbitrary Y=Yb and Y=(Ya−Yb). Then, so long as this condition is satisfied, the target pressing force can be set in any required manner.

Figure 9A:
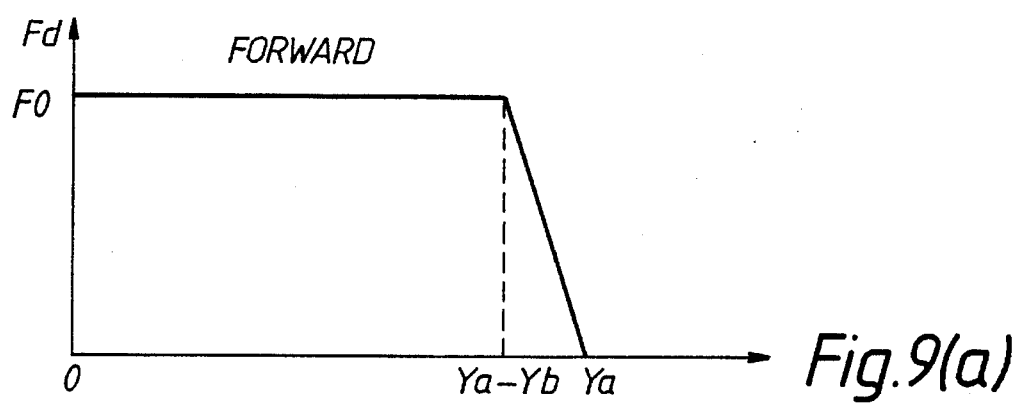
FIGS. 9(a) and 9(b) are graphs showing another example of the target pressing force applied to the grinder according to the present invention.
Figure 9B:
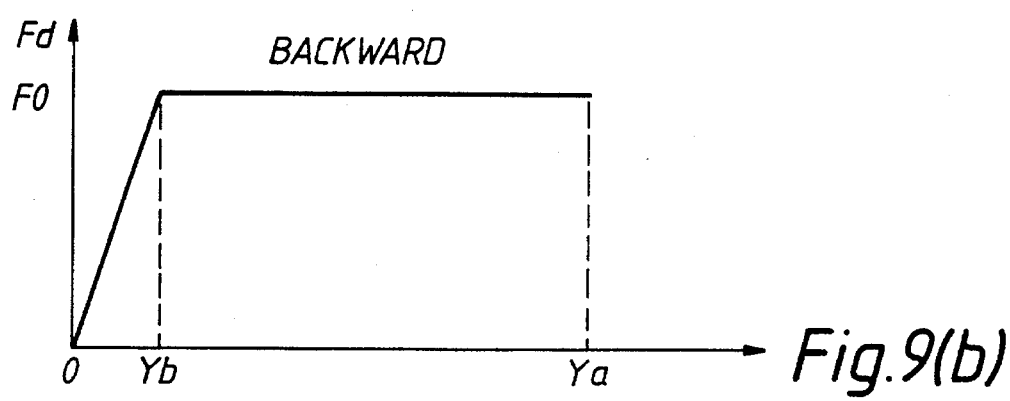

FIGS. 9(a) and 9(b) are further examples of target pressing force functions which may be applied to the grinder according to the present invention. Different functions are applied during advancing of the grinder and during retraction of the grinder. FIG. 9(a) shows the function when the grinder is advancing. The target pressing force Fd is gradually decreased from F0 just before stoppage of the grinder, i.e. only in the range $(Ya-Yb) \leq Y \leq Ya$. FIG. 9(b) shows the function when the grinder is being retracted. The target pressing force Fd is likewise gradually reduced in the direction of F0 just before stopping the grinder, i.e. only in the range $Yo \leq Y \leq Yb$.

Of course, in this case also, it is not necessary to make the target pressing force Fd of the grinder 0 on grinder stoppage or at the grinder start-up time, and, as shown in the example illustrated in FIG. 7, it would be possible to make the target pressing force Fd have an arbitrary value F1.

Also, it is possible to effect control in a manner opposite to the functions of FIG. 9(a) and FIG. 9(b), such that the target pressing force is progressively increased immediately after grinder start-up. The benefit of the present invention can be obtained in this way also.

It should be noted that, although, in each of the above examples, the target pressing force of the grinder is given as a function Fd(Y) of the Y direction, it is not necessarily essential to express the target pressing force of the grinder as a function of position. For example, control could be exercised wherein the target pressing force of the grinder is changed based on the number of times of sampling of the control system from grinder start-up to grinder stopping in the Y direction, as a function correlated with position.

Further, the target pressing force of the grinder, instead of being made a function Fd(Y) of the Y direction, could be made a function including position in the X direction, i.e. Fd(X, Y). For example, control could be exercised to make the grinder target pressing force Fd smaller also in the vicinity of X=X0, X=Xa in FIG. 3 (i.e. in the vicinity of the boundary of the grinding region in the X direction).

Next, a second embodiment of the method of controlling a grinder robot according to the present invention of this application will be described with reference to FIG. 10 and FIG. 11. Similar elements noted in FIGS. 10 and 11 have been given the same reference numerals as corresponding elements in FIG. 2–9, and a redundant description of this similar elements is not provided here.

Figure 10:
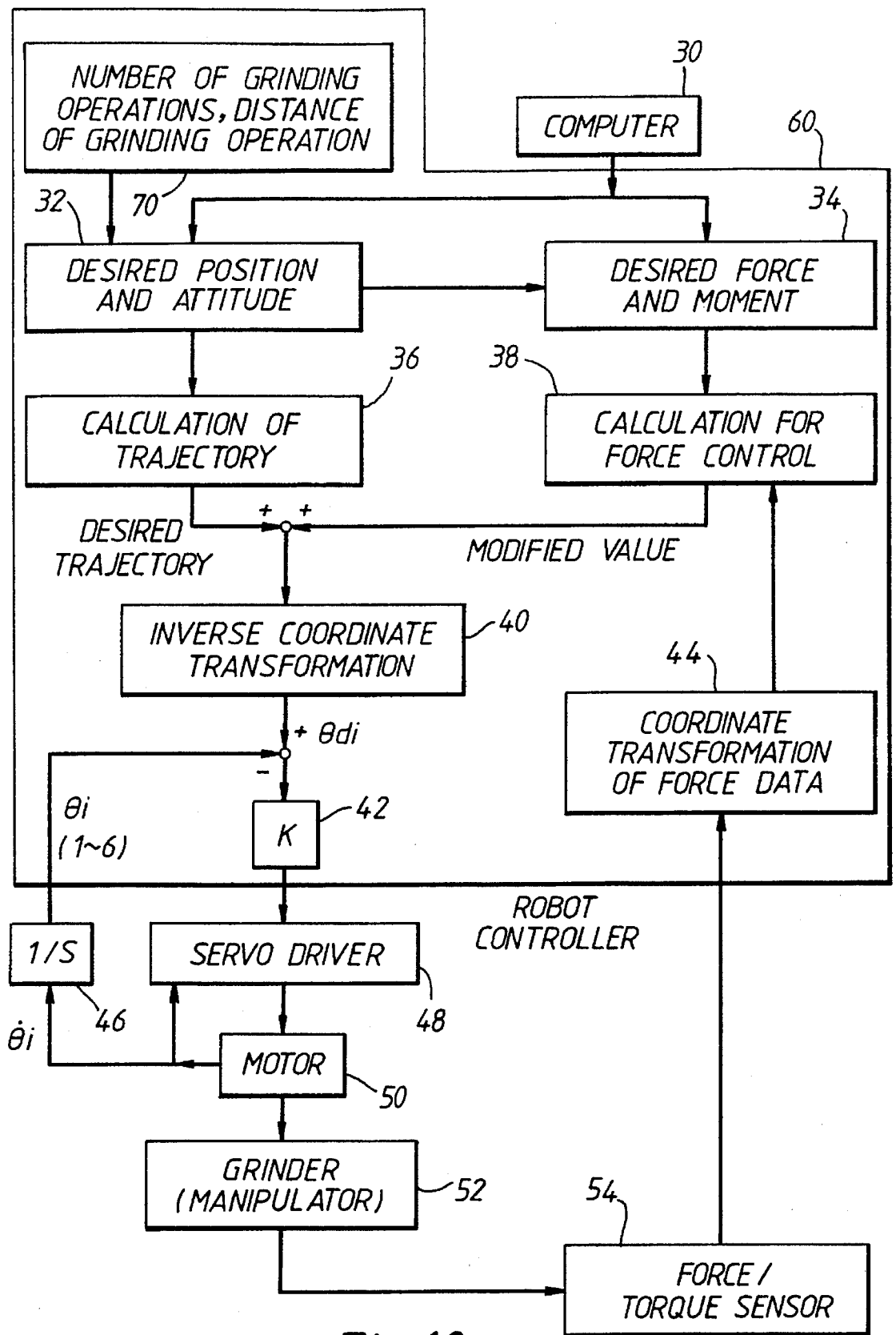
FIG. 10 is a block diagram of the control layout illustrating a second embodiment of the method of controlling a grinder robot according to the invention of this application.

FIG. 10 shows the control layout of a grinder robot. The distance over which the grinding operation is performed in the Y direction is varied for each respective reciprocatory operation. Specifically, the starting point and termination point of each reciprocatory grinding operation are progressively varied, thereby dispersing the starting point and end point of the grinding operation, and consequently dispersing the boundary of the grinding region. As a result, the target position and attitude of the grinder (in particular, position in the direction of the work normal) are varied depending on the number of operations that have been formed, or on the operating distance, etc. In the embodiment shown in FIG. 10, a Number of Grinding Operations or Distance of Grinding Operation 70 element is provided to take into consideration the number of reciprocate grinding operations and the distance from (0,0) to X direction. These data are then automatically counted and memorized in a memory such as a RAM, etc.. And according to these data, the start position of each reciprocating grinding operation is not always the same, and is optionally controlled along the Y direction, so the Desired Position and Attitude 32 is inevitably changed.

Figure 11:
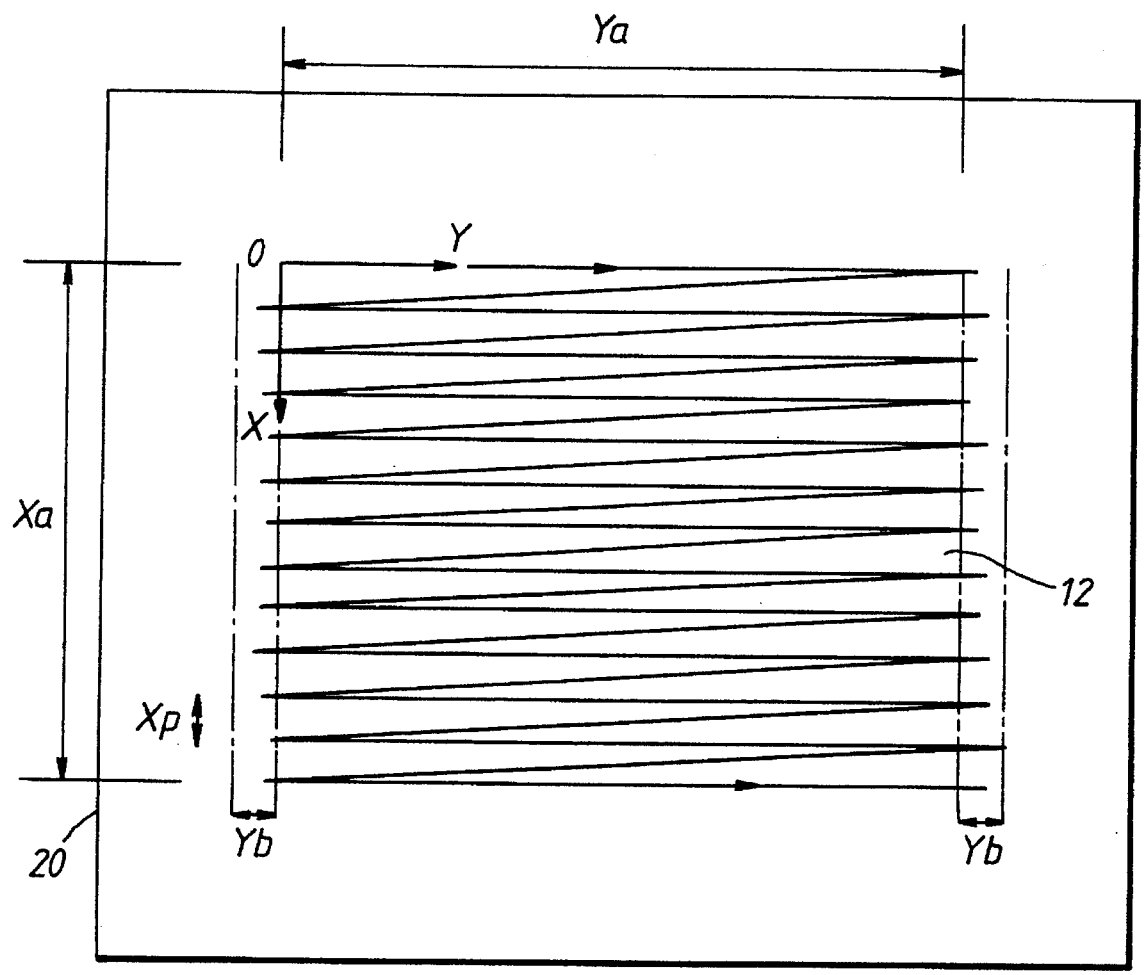
FIG. 11 is a view showing the track above the work of a grinder controlled in accordance with the above embodiment.

FIG. 11 is a view showing the grinding mode produced in this embodiment, illustrating the track of the grinder over the work 20 adopted in the case of this embodiment.

The grinding operation return position in respect of a grinding region 12 produced by a grinder is given as follows.

First of all, where Y=0, $$(X, Y)=(Xp \times i, Yb \times RAND(i)) \quad (1)$$

where i=0, 1, 2, 3 ... N, i=0 represents the starting point of the operation, and RAND(i) is a function expressing a random number between 0 and 1.

Also, where Y=Ya, $$(X, Y)=(Xp \times i, Ya+Yb \times RAND(i)) \quad (2)$$

where i=0, 1, 2, 3 ... N, and i=0 represents the starting point of the operation, and RAND(i) is a function expressing a random number between 0 and 1.

In this case, Yb is set to give a positive value outside grinding region 12, but either a positive or a negative value could be chosen. The position of the boundary of grinding region 12 can be set irregularly within the range of the width of Yb.

Further, although, in the above expression, the grinding distance was symmetric about Y=Ya/2, it could of course be asymmetric. For example, a method may be adopted in which Yb has different values on the Y=Ya side and on the Y=0 side.

The following method is a further example of the asymmetric case. Specifically, on the side where Y=0, the grinding operation return position is chosen to be:

$$(X, Y)=(Xp \times i, Yb \times RAND(2i)) \quad (3)$$

where i=0, 1, 2, 3, ... N, and i=0 defines the starting point of the operation.

And on the side where Y=Ya:

$$(X, Y)=(Xp \times i, Ya+Yb \times RAND(2i+1)) \quad (4)$$

where i=0, 1, 2, 3 ... N, and i=0 defines the starting point of the operation.

Although, in the above expressions (1) to (4), the reciprocatory distance of the grinder is expressed as a function of the number of reciprocations i, position in the X direction is also determined by i. Consequently, the reciprocation distance is a function of position in the X direction.

In the above example, the position of the boundary of grinding region 12 was set irregularly by a random number. However, it could be given by a function not having a fixed value, such as for example a triangular function or a saw-tooth or hill-shaped function.

For example, if the position of the boundary of grinding region 12 is made to vary in accordance with a sine function, the return position of the grinding operation can be expressed by the following expressions respectively on the side where Y=0 (equation 5) and on the side where Y=Ya (equation 6).

$$(X, Y)=(Xp \times 1, Yb \times \sin(a \times a+b)) \quad (5)$$

where i=0, 1, 2, 3 ... N, and i=0 represents the starting point of the operation.

$$(X, Y)=(Xp \times i, Ya+Yb \times \sin(a' \times i+b')) \quad (6)$$

where i=0, 1, 2, 3 ... N and where a and b are arbitrary values.

Thus, when the method according to the second embodiment is employed, the boundary of grinding region 12 can be finished irregularly, so that there is no possibility of the formation of a linear step in the vicinity of the boundary.

Thus, finishing can be effected to a condition in which the boundary position is varied in a random manner with each reciprocatory operation. Grinding can therefore be effected to a condition such as is produced by a skilled worker by a manual operation. Of course, finishing can be performed to achieve a work in which stress concentration is much less likely that it is with the conventional operation.

In the above, there is described a first embodiment in which the target pressing force is varied by making it smaller in the vicinity of the boundary of the grinding region, and a second embodiment in which the position of the boundary of the grinding region is varied. However, these two embodiments could be employed simultaneously, to give a resulting finish even closer to that obtained by a skilled manual operator.

All the above embodiments are described, for simplicity, for the case of a planar work. However, the method of controlling a grinder robot according to the present invention could of course be applied to works having a surface defined by any desired cubic curve or shape.

In the embodiments described above, the grinder robot employed can have any desired axial configuration and/or method of force control, so long as it is possible to alter the target pressing force of the grinder in a manner dependent on grinder position.

Next, a method of controlling a grinder robot according to a third embodiment of the present application will be described with reference to FIG. 12 through FIG. 14. Similar elements as noted in FIGS. 12–14 have been given the same reference numerals as corresponding elements in FIGS. 1–11, and a redundant description of these elements is not provided here.

Figure 12:
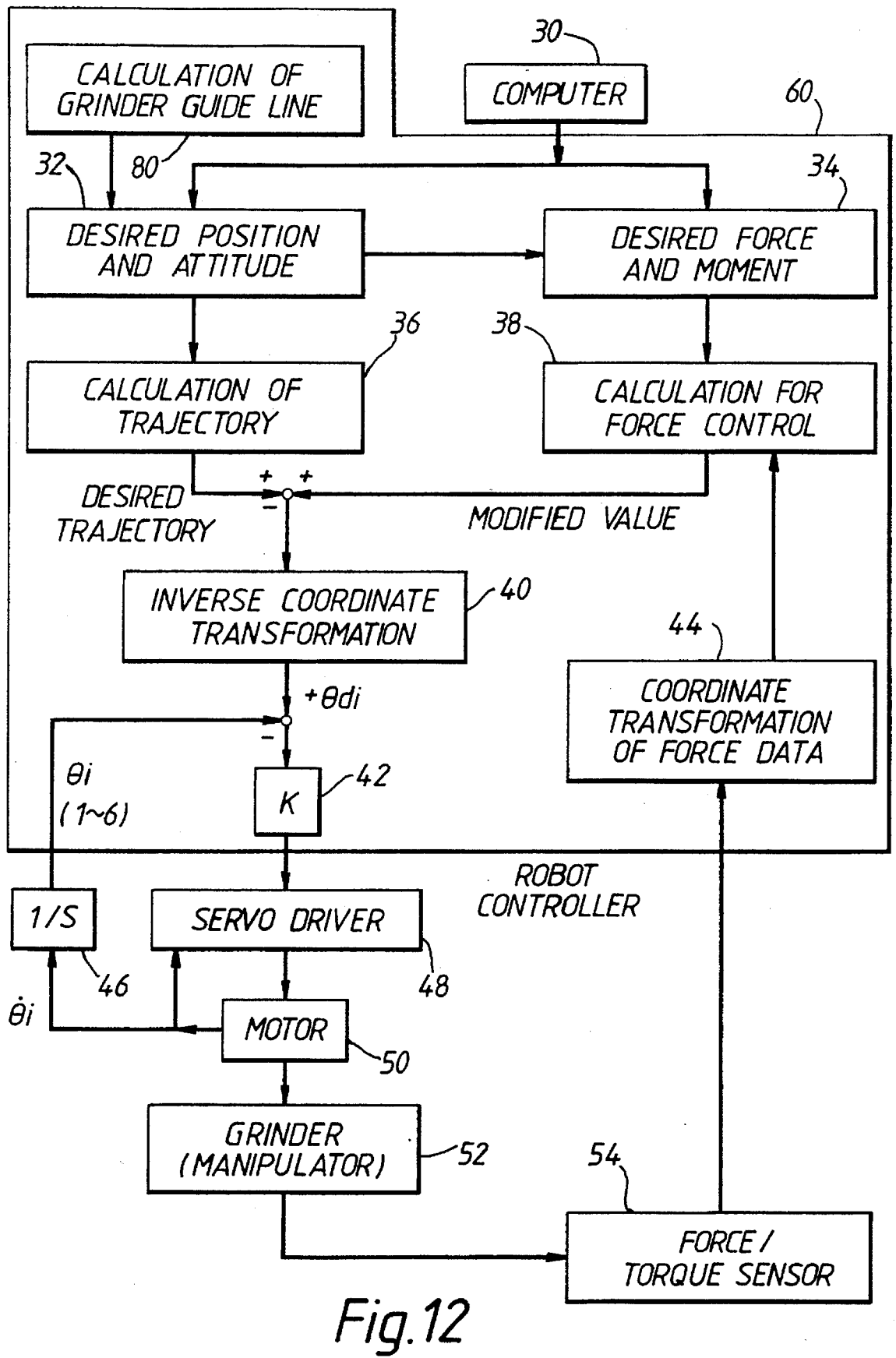
FIG. 12 is a block diagram of a control layout illustrating a method of controlling a grinder robot according to the invention of this application.

FIG. 12 shows the control layout of a grinder robot. The position of commencement of a grinding operation is determined by obtaining actual contact between the grinder and the work a plurality of times. In this embodiment of FIG. 12, a Calculation of Grinder Guide Line 80 element calculates the data of contact positions of the grinder to the work. In FIG. 13, P1~PN are the contact positions and L1 is the Grinder Guide Line. The outline of the generated Grinder Guide Line is then dependant on the contact positions, so the Desired Position and Attitude 32 is inevitably changed. Consequently, information as to the position for commencement of operation is stored and held in the form of target values of position and attitude, and is utilized for the calculation of the target track by reading out these values on each operation. Alternatively, operating position and attitude are calculated for each operation from the point where contact was previously made, and these are then used to perform the target track calculation.

Target positions for each axis are obtained by inverse coordinate transformation from the target track calculated values and a position feedback loop and speed feedback loop etc. are constituted such as to track the target positions of each of these axes.

In contrast, when carrying out force control, the actual pressing force is calculated from the outputs of the six-axis force/torque sensor 54 fixed in the vicinity of the grinder 50, and force control calculation is performed using the target pressing force and the calculated actual pressing force. The result obtained is used to correct the target track calculated value. In this way, force control can be achieved such as to provide a prescribed pressing force.

Designation of the target values of position and attitude and/or target values of force and moment, or of work shape and/or work grinding region boundary position etc., can be input through computer 30. Regarding the construction and fundamental control method of the robot, those described in U.S. Pat. No. 5,265,195, as in the case of the invention described above, can be directly adopted, and such disclosure thereof is incorporated herein by reference and a detailed description in this respect is therefore omitted.

Next, a third embodiment of a method of controlling a grinder robot according to the present invention will be described. This embodiment is particularly effective when the work surface has severe burrs and/or irregularities or is comparatively soft. The conditions in which this third embodiment is beneficial are of course not limited to these.

Figure 13:
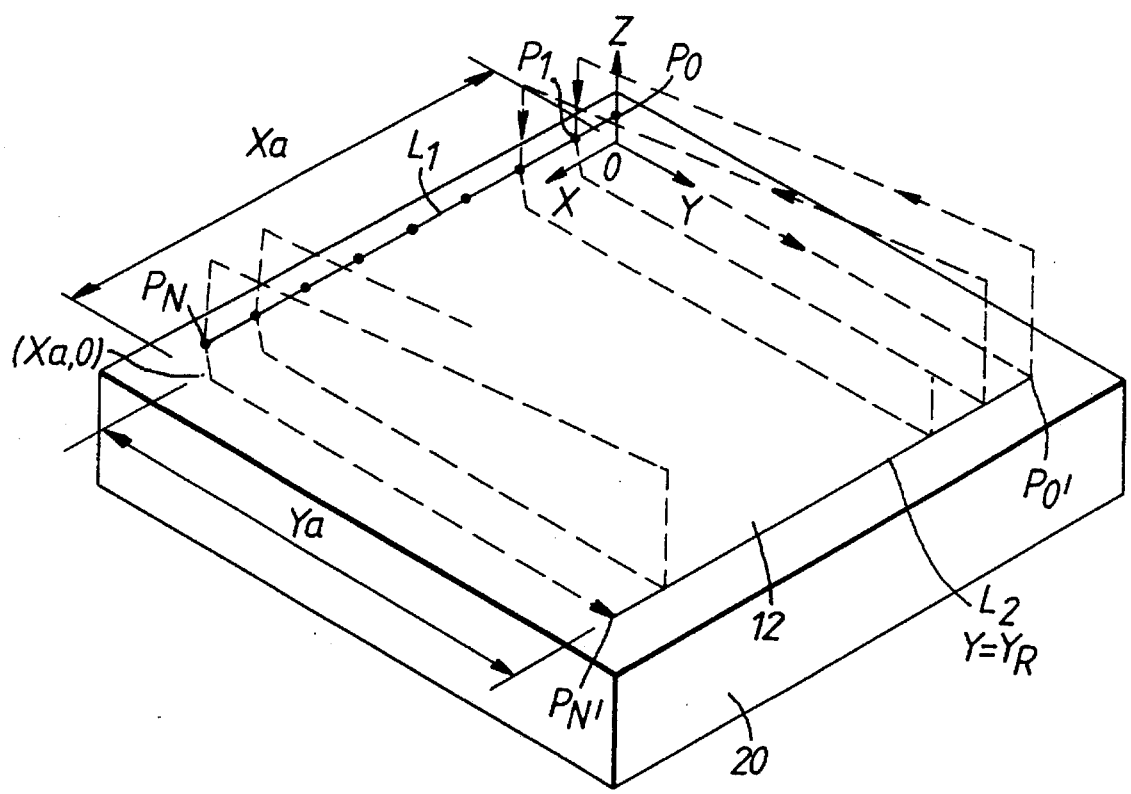
FIG. 13 is a perspective view showing an example of a work which is the subject of the grinding operation.
Figure 14:
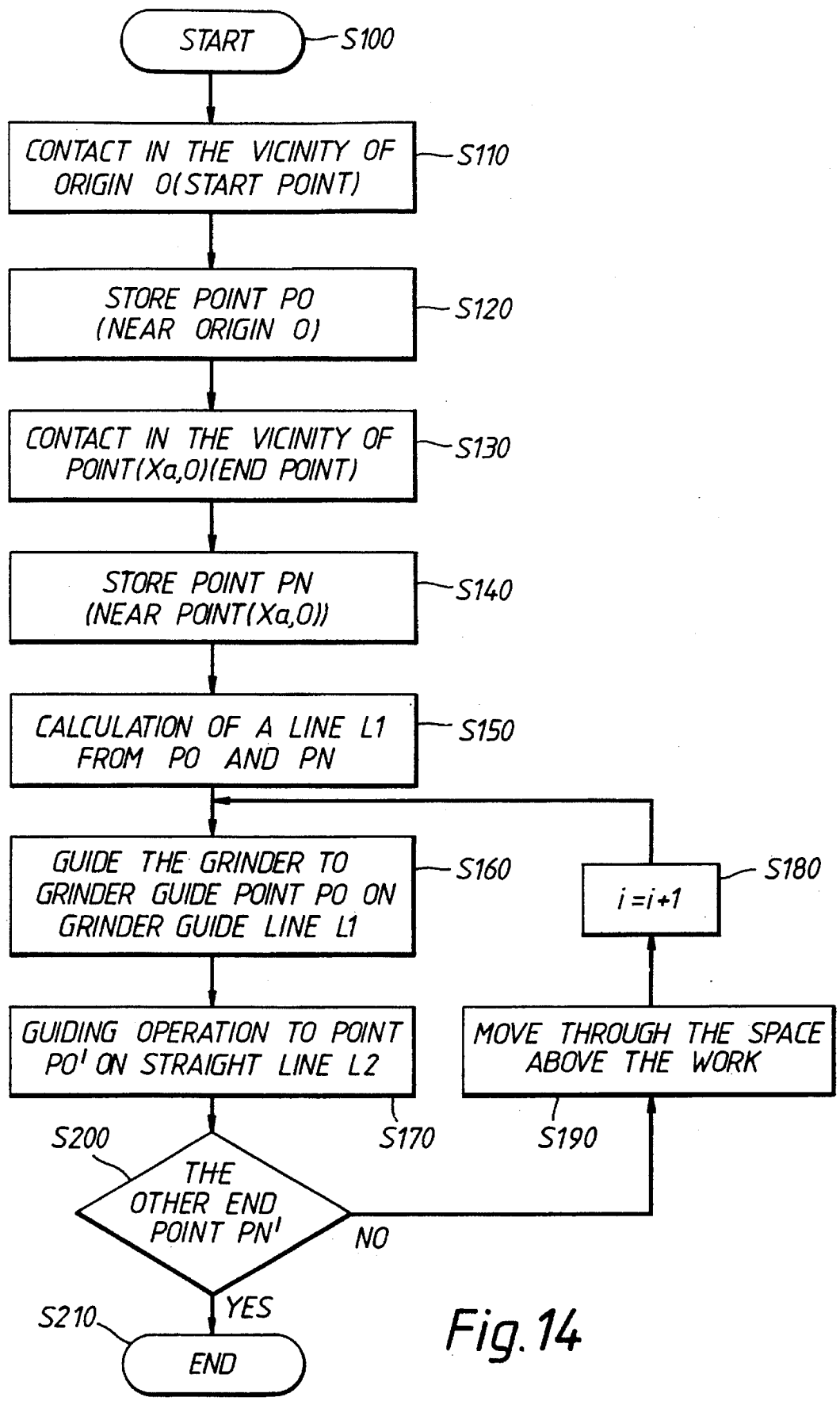
FIG. 14 is a flow chart showing the sequence of the grinder operation according to the above embodiment.

For example, the case in which a grinding operation is performed by reciprocating the grinder in the Y direction over a rectangular grinding region 12 defined by Y=0, Y=Ya, X=0, X=Xa, on a work 20 as shown in FIG. 13 will be described. The operation of the grinding operation is described in FIG. 14.

First of all, the grinder is moved to above (Z>0) to the origin 0 (0,0). The grinder is then lowered to make contact in the vicinity of origin 0 (step S110). At least one six-axis force/torque sensor 54 is mounted at an arm tip of the grinder robot, so whether or not the grindstone and work are in contact can easily be ascertained from the output of the sensor 54.

Taking the contact point as a reference, a point PO slightly separated from this point is then stored (step S120). The method of selecting point PO is arbitrary. For example, a point about 1 millimeter away in the Z direction from the contact point may be employed. However, as well as being separated in the Z direction, the point could also be separated in the Y direction.

It should be noted that, if, instead of storing a point PO, the contact point itself is directly stored, there is a risk that, due to flexing of the arm and/or grindstone, or to the response of the force/torque sensor 54, the contact point may be calculated as lying within the work surface. It is therefore preferable from a safety point of view to store a point PO that is slightly separated from the contact point. From the point of view of efficient operation, it is desirable that point PO should be set as close as possible to the work 20 within a range such that there is no risk of the grindstone colliding with the work 20.

Point PO may be obtained by calculation from the contact point, but in practice it is sufficient to move the grinder somewhat in the direction away from the work, and to store the position to which it is moved.

Next, the grinder is moved to a position above another point (Xa,O) at the boundary of the grinding region, and the grindstone is then brought into contact with the work in the vicinity of this point (Xa,O) (step S130). Then, just as in the case of point PO, a point PN slightly removed from point (Xa, 0) is stored (step S140).

Once point PO and point PN have thus been found, a straight line L1 containing these points PO and PN is then calculated (step S150) (a line such as straight line L1 calculated in this way is called a "grinder guide line", and points PO, P1, PN, etc. are called "grinder guide points"). The grinder is then guided to grinder guide point PO on grinder guide line L1 (step S160).

A grinding operation is then performed up to a point PO' on a straight line L2 (Y=Ya) by retracting the grinder, while performing force control in the work normal direction (Z direction) from the grinder guide point (step S170).

In this case, the plane that it is desired to grind is a plane containing point 0 and point PO', and grinder guide point PO is not on this plane. However, the grindstone is moved slantwise so as to contact the work by starting force control from grinder guide point PO and shifting the grinder in the Y direction. As a result, it is thereby possible to perform grinding from point 0 up to point PO'. By setting grinder guide line L1 at a position closer to the work, time wasted in moving the grindstone diagonally up into contact with the work can be reduced, and the grinding region can be more accurately specified.

When grinding as far as point PO' is completed, it is determined whether the grinding operation is completed to an end point PN' (step S200), and if the overall grinding operation is not completed the grinder is moved away from work 20. The grindstone is then moved through the space above the work 20 in a manner such that it does not collide with work 20 (while maintaining a non-contacting condition), and is guided to a new grinder guide point P1 on grinder guide line L1 (step S190).

The new grinder guide point to which the grinder is guided is expressed by the following equation:

$$\vec{Pi} = (\vec{PN} - \vec{Po})i/N + \vec{Po}$$

where i=0, 1, 2, 3 . . . N, i is the grinder guide point when the i-th guiding operation is performed and N is the number of grinder reciprocation. If the pitch of transverse feed is taken as Xp, N=Xa/Xp (where N is a natural number). Equation (7) is a vector expression.

The grinder track followed by the grinder in the grinding and guiding processes described above is shown by a dented line in FIG. 13. The reason why the grinder track is illustrated slantwise from the grinder guide point (e.g. point PO or point P1) on the grinder guide line L1 is because, as mentioned above, force control is commenced from a non-contacting condition of the grinder, and the grinder is shifted in the Y direction. The operation of grinding the grinding region 12 can be performed by repeating the above operation up to the other end PN' of grinding region 12.

In this embodiment, the grinder guide point Pi is specified beforehand on grinder guide line Li, so, even if there is some error in the position in which the work 20 is fixed, there is no risk of the grindstone colliding with the work 20. The grinder can therefore be moved at high speed even when moving through space, and so can be guided to the vicinity of the grinding commencement position in a short time. This enables the operation as a whole to be performed efficiently. Also, the problems of the guider getting too far away from the work or, in the opposite situation, of the grindstone cutting too deeply into the work, are eliminated.

It should be noted that the grinding operation can also be commenced from point PN. In this case, the movement time from point PN to point PO can be shortened.

The above embodiment showed a case in which this invention was applied to a flat grinding region. However, the present invention could of course be applied to grinding regions of other shapes.

Figure 15:
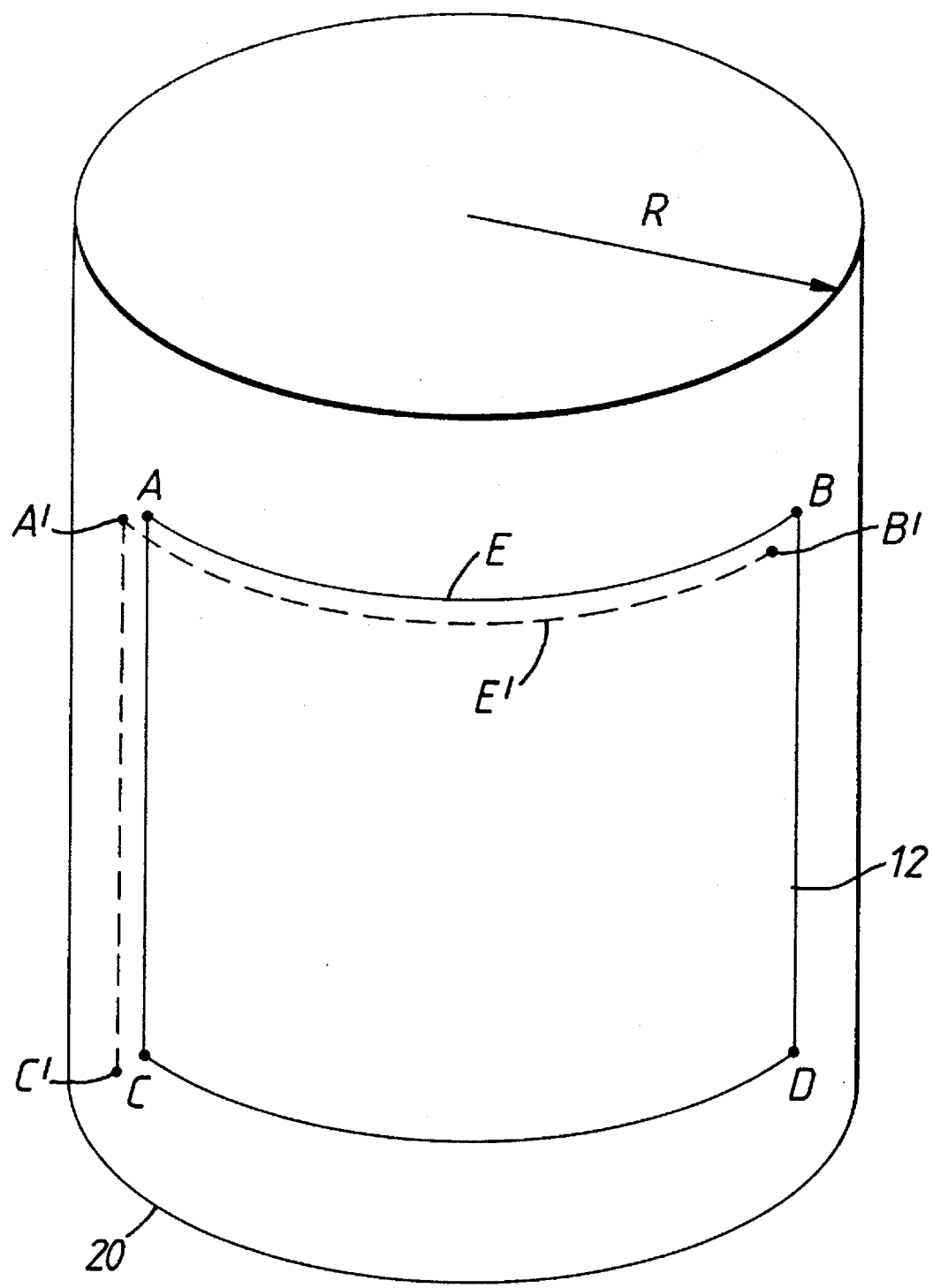
FIG. 15 is a perspective view showing a further example of a work which is the subject of a grinding operation.

For example, a fourth embodiment of this invention will be described for the case where a grinding region 12 defined by points A, B, C, D on a cylinder as shown in FIG. 15 is ground.

First of all, when grinding is carried out in the direction A→B, just as in the case of grinding a plane, grinder guide points A' and C' are found by bringing the grindstone into contact with point A and point C. The grinder guide line A'C' may then be calculated. However, in contrast with the case of grinding a plane, when grinding a curved surface, it is necessary to alter the grinder attitude. However, it is not normally necessary to set the grinder attitude with respect to the work with high precision. Errors sufficient to cause a problem are therefore not experienced. The attitude at each position may be obtained beforehand by calculation in conformity with the shape of the work 20.

Next, on performing grinding in the direction A→C, the grinder guide line will be accurate. In such a case, an accurate grinder guide line A'B' can easily be calculated from the radius R, which can be known beforehand, and grinder guide lines A' and B' which can be obtained by bringing the grindstone into contact at point A and point B. If radius R is unknown, the grinder guide line A'B' can be calculated from three points: A, B, and E; point E being obtained by bringing the grindstone into contact at a point somewhere between point A and point B.

Also, when a curved surface of a shape that cannot be defined in a simple manner is to be ground, it is desirable to bring the grinder into contact with a large number of points on the work 20. The number of points where contact is made is selected such as to enable the grinder guide lines to be approximated by straight lines and/or arcs. Of course, in the above examples also, the grinder guide line can be calculated by bringing the grinder into contact with a plurality of points. In particular in cases where there are a large number of burrs and/or irregularities in the vicinity of the contact points, the target shape can be ground more accurately by calculating the grinder guide lines from contact at several points.

In this embodiment therefore, planar, quadratic, or cubic-curved surface grinding regions can be coped with by calculation of grinder guide lines.

Next, a method of calculating a grinder guide line by bringing the grinder into contact with the work 20 continuously will be described.

Figure 16:
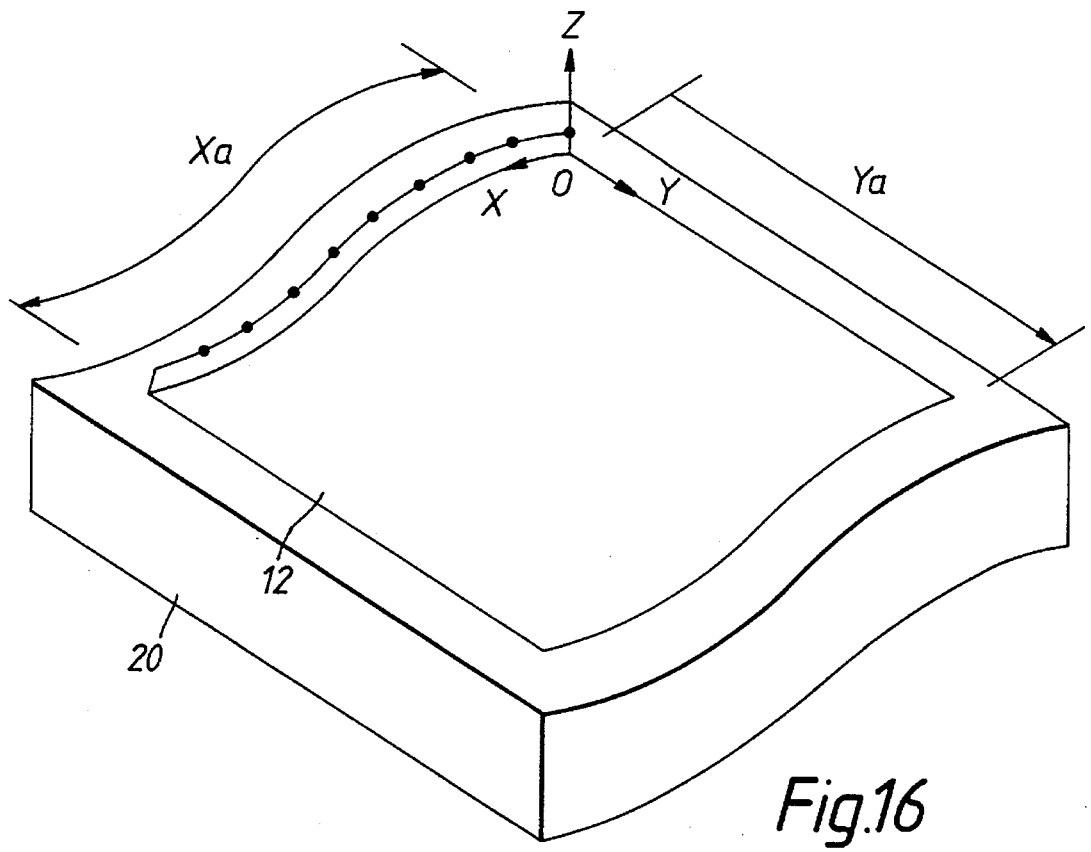
FIG. 16 is a perspective view showing a further example of a work which is the subject of a grinding operation.

The case of performing a grinding operation on a curved grinding region 12 defined by Y=0, Y=Ya, X=0, X=Xa, Z=0, on a work 20 as shown in FIG. 16 will now be described. A coordinate system matching work 20 is selected. In this example, the grinder is brought into contact continuously from the origin 0 to point (Xa, 0) (as indicated by the thick line in the drawing), and the grinder guide line is calculated from this line of contact. The various grinder guide points (shown as dots in the FIG. 16) are then determined from this. In this process, the grinder can move towards the side (i.e. the diametric direction of the grindstone), so the grindstone can be moved in contact with the surface of work 20, rolling across it in the X direction. In this way, the grindstone and work can be kept in contact with each other in a smooth manner without a load on the grindstone.

Grinder guide points may then be stored, for example, at equal intervals as shown in FIG. 16. With this embodiment, matching to a work of complicated shape can easily be achieved without the need to calculate a complicated grinder guide line by the troublesome process of approximation by means of straight lines or arcs.

Next, a fifth embodiment in accordance with the present invention will be described. The operation of grinding a grinding region 12 defined by Y=0, Y=Ya, X=0, X=Xa, on a work 20 as shown for example in FIG. 13 will be described with reference to FIG. 17, just as in the case of the first embodiment described above.

Figure 17:
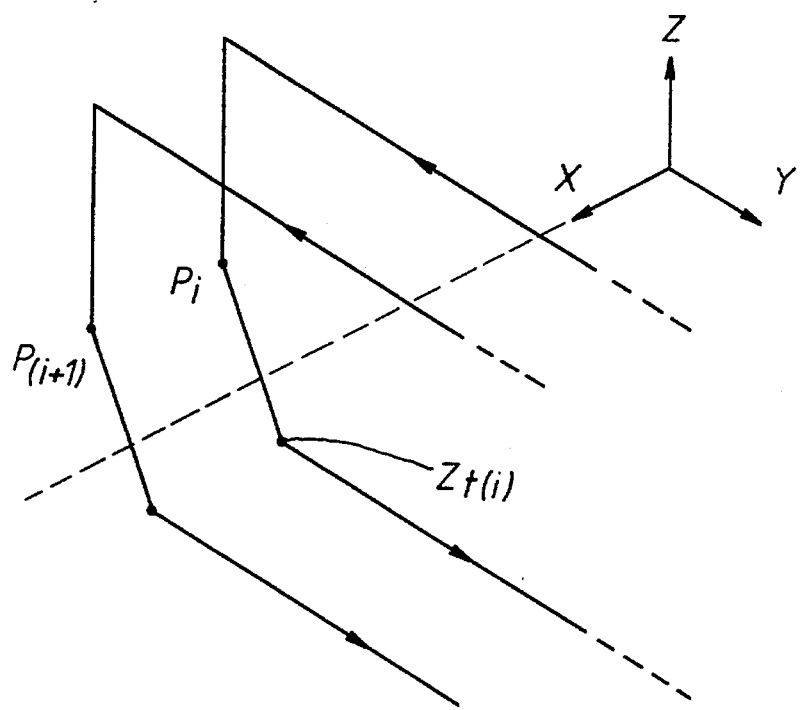
FIG. 17 is a diagram to a larger scale of the vicinity of a grinder guide point.

FIG. 17 is a view of the vicinity of a grinder guide point Pi to a larger scale, the grinder track being shown by a continuous line. This grinder track corresponds to that shown with a dented line in FIG. 13.

This embodiment provides a method whereby a new grinder guide point can be determined from the grinder guide point used on the previous occasion or from the contact point on the previous occasion. The grinder contact position $Zt(i-1)$ on a previous occasion is stored, and grinder contact point Pi is determined with this position as a reference. The components $(X_i, Y_i, Z_i)$ of grinder guide point Pi can therefore be expressed as follows in sequence from X=0:

$$Pi=(X_i, Y_i, Z_i)=(Xp \times i, 0, Zt(i-1)+Za) \qquad (8)$$

where i=0, 1, 2, 3, ... N, where Xp is the grinder feed pitch, $Zt(i-1)$ expresses the component in the Z direction of the point at which contact is made with the work at the start of the previous grinding operation, and Za expresses the distance of separation from the work in the Z direction.

In this case, since grinding in the XY plane is being considered, position in the X direction and Y direction is determined beforehand in accordance with the grinding region. Also, under the assumption that the position in the Z direction will be about the same as that on the previous occasion, the grinder is guided to a position that is removed by an amount Za from the Z component $Zt(i-1)$ of the contact point used on the previous occasion. The grinding operation can be made more efficient by setting removal distance Za to be as small as possible.

Even in the case where the grinding region is not planar but a curved surface, if its curvature is comparatively small, grinder guide points can be determined by the method described above. Also, if the work shape is known beforehand, as for example if the arc curvature is known in the case of an accurate work, the grinder guide point to be used for the current grinding operation can be determined from this curvature and the transverse feed pitch, from the contact point found on the previous occasion.

With this embodiment, it is not necessary to find a grinder guide line before the operation, and the new grinder guide point can be determined when required using the guide point of the previous occasion or the contact point of the previous occasion. As in the case of the embodiments described above, the grindstone is moved over the work so as not to contact or collide with the work (while maintaining a non-contact condition), and is then guided to the grinder guide point.

The new grinder guide point can be determined from the grinder guide point used before the preceding occasion (i.e. two or more reciprocations previously).

Next, a sixth embodiment of this invention will be described. The third embodiment described above is a method adapted for the case where there are severe burrs and/or irregularities in the work, or where the work is comparatively soft. However, this sixth embodiment describes a method which is suited for grinding weld beads or plug welds.

Figure 18:
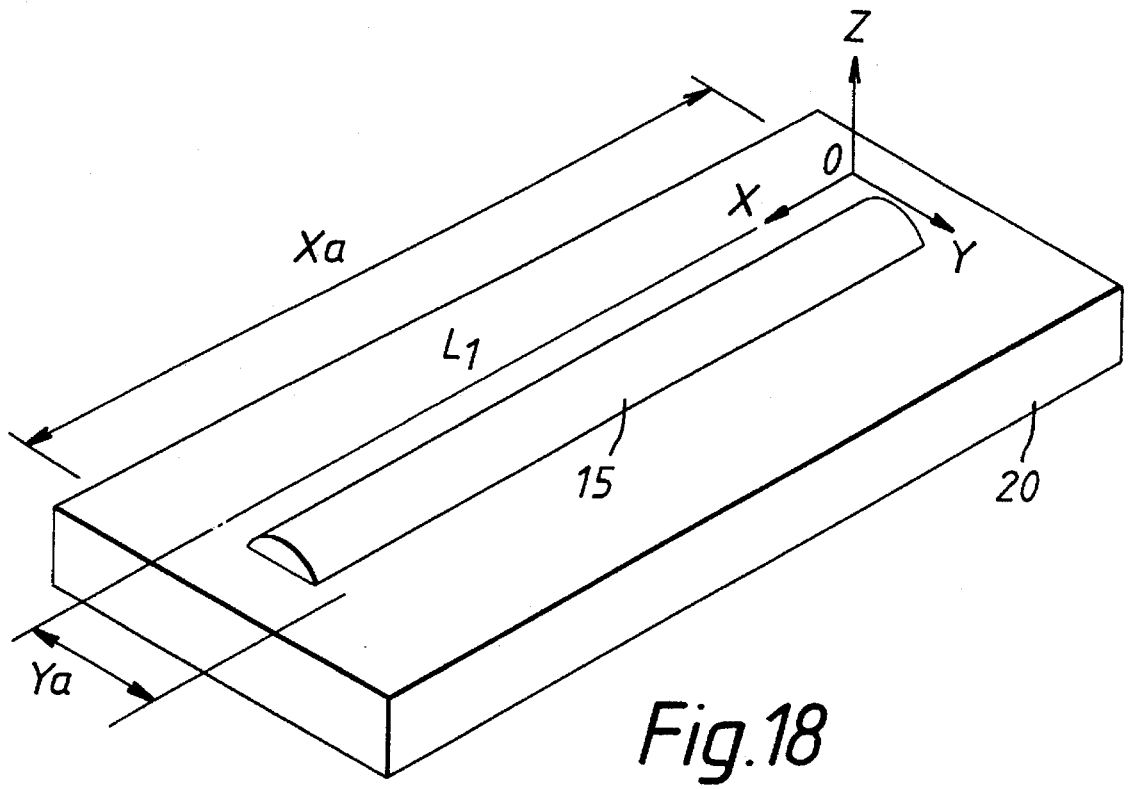
FIG. 18 is a perspective view showing a further example of a work which is the subject of a grinding operation.

For example, the case of grinding a weld bead as shown in FIG. 18 will be described. In this embodiment, the grinder guide line or grinder guide point described in the third to fifth embodiments is applied to the grinder return position.

In this embodiment, just as in the third embodiment, let us assume that a grinding operation is performed on a rectangular grinding region 12 defined by Y=0, Y=Ya, X =0, X=Xa. A grinder guide line L1 is then calculated by bringing the grinder into contact with the work in the same way as in the method described above. The grinder guide point and grinder guide line could be set on the work surface, or, as in the first embodiment, these could be set at positions slightly removed from the work surface.

Next, grinding is carried out with a fixed pressing force and feed speed from Y=0 to Y=Ya. In this process, it is desirable to perform grinding with a pressing force that is weaker than normal so as not to cut away more than the necessary parts, e.g. so that parts other than weld bead 15, i.e. parts of work 20 which are not projecting, are not removed.

In this way, grinding is performed up to Y=Ya, and then, in the embodiment described above, the grinder is moved, in a non-contacting condition, utilizing the space above work 20. However, in this embodiment the grinder is returned by being moved in a straight line to a grinder guide point on grinder guide line L1. The projecting part of weld beam 16 is then ground away while exercising force control in the feed direction of the grinder during this return movement.

The grinding operation proceeds in this way by moving the grinder back and forth a plurality of times, until weld bead 15 is completely ground away. That is, the return point for the grinding operation is constituted by a point on grinder guide line L1.

Figure 19:
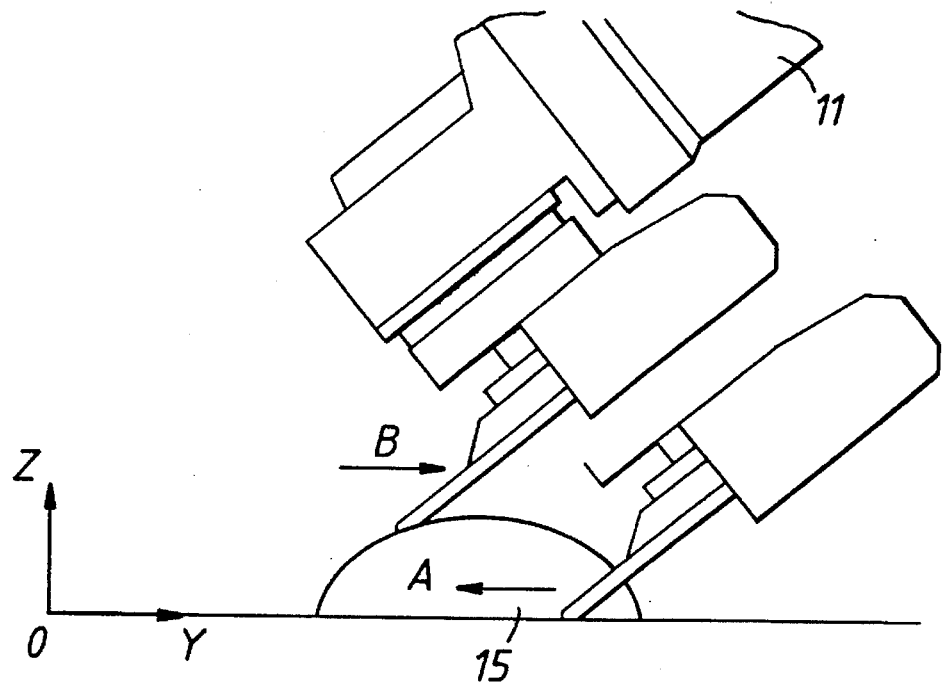
FIG. 19 is a view showing a tool applied to grind a weld.

FIG. 19 shows the grinding operation, viewing work 20 from the X direction. If grinder 11 were to be moved (advanced) in the direction A with a constant feed speed, danger of overloading would arise on snagging of the grindstone on the projecting portion constituted by weld bead 15. The force F acting on grinder 11 is therefore detected by a six-axis force/torque sensor (not shown) and this is determined such that the feed speed is always constant.

The force F acting on the grinder can be expressed as follows using the detected values from the six-axis force/torque sensor:

$$F = (Fx2 + Fy2 + Fz2) \quad (9)$$

Also, in order to move the grinder linearly towards grinder guide point Pi on grinder guide line L1 while always keeping the force acting on the grinder constant at Fd, the target position Pdn of the grinder at each sampling time may be given by the following expression:

$$\vec{Pdn} = \frac{\overrightarrow{(Pd(n-1)Pi)}}{|Pd(n-1)Pi|} \times K(Fd - F) + \vec{Pd}(n-1) \quad (10)$$

where Pd(N−1) is the target value at the time of the previous sampling, and K is the force control gain. Expression (10) is a vector expression.

With this method, efficient removal by grinding of projecting portions only can be achieved without removing more than the necessary portions other than weld beam 15, i.e. the non-projecting portions of work 20, and irrespective of the height of weld bead 15.

This embodiment and the first embodiment differ in regard to the track and the method of force control when the grinder is advanced, but they are identical in their use of a grinder guide line and/or grinder guide point. Consequently, the method of application to the case where the grinding region is a curved surface and/or the method wherein the new grinder guide point is determined from the grinder guide point used on the previous occasion can be utilized, as illustrated in the fourth and fifth embodiments.

Also, when this embodiment is applied to, for example, an arbitrary cubic curved surface, if it is inconvenient to make the track along which the grinder is advanced a straight line, this track may be suitably modified depending on the finishing shape.

With either method, the possibility of grinding away more than the necessary parts other than the weld bead, i.e. the non-projecting parts of the work 20, can be eliminated and efficient grinding, confined solely to the projecting parts, can be achieved irrespective of the height of the weld bead.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for controlling a grinder robot, comprising the steps of:

driving a grinder connected to said grinder robot;

pressing said grinder against a grinding region of a work, said grinding region being a region to be ground by the grinder; and controlling a pressing force of said grinder to be reduced as said grinder approaches a vicinity of a boundary of said grinding region so that an inside of the boundary of said grinding region is tapered.

2. A method of claim 1, wherein the pressing force of said grinder in the vicinity of the boundary of the grinding region is controlled so as to be constantly reduced to zero at the boundary of the grinding region.

3. A method for controlling a grinder robot, comprising the steps of:

driving a grinder connected to said grinder robot in a first direction;

pressing said grinder against a grinding region of a work while driving the grinder in the first direction;

lifting the grinder to not contact the work and moving the grinder in a second direction while the grinder is not contacting the work, so that the grinder is moved in a reciprocatory operation in the first and second directions; and altering distances that the grinder is moved in the first and second directions in a random manner with each reciprocatory operation.

4. A method of claim 3, wherein said altering step varies a commencement position and a termination position of the grinder.

5. A method for controlling a grinder robot, comprising the steps of:

driving a grinder connected to said grinder robot in a first direction;

pressing said grinder against a grinding region of a work while driving the grinder in the first direction;

lifting the grinder to not contact the work and moving the grinder in a second direction while the grinder is not contacting the work; and altering distances that the grinder is moved in the first and second direction, wherein the first and second distances are altered as a function of a number of times of the grinding operation.

6. A method of claim 5, wherein the function is defined as a random number function.

7. A method for controlling a grinder robot, comprising the steps of:

driving a grinder connected to said grinder robot;

contacting said grinder to a grinding region of a work to generate at least one contact point between the grinder and the grinding region calculating a guide line of said grinder using the at least one contact point obtained by said contacting step; and controlling said grinder so as to start all grinding operations from a position on said guide line.

8. A method of claim 7, wherein a force control of said grinder is exercised in a normal direction of the work while the grinding operation is started from said guide line, and said grinder and the work are maintained in a non-contacting condition while effecting a return of the grinder to said guide line.

9. A method of claim 7, wherein a force control of said grinder is exercised in a normal direction of the work while the grinding operation is started from said guide line, and the force control of said grinder is exercised in a tangent direction of the work during a feeding grinding operation from said guide line.

10. A method for controlling a grinder robot, comprising the steps of:

driving a grinder connected to said grinder robot;

contacting said grinder to a grinding region of a work to generate at least one contact point between the grinder and the grinding region;

calculating a guide point of said grinder using the at least one contact point obtained by said contacting step;

controlling said grinder so as to start a grinding operation from a position on said guide point; and calculating a subsequent guide point of said grinder using said guide point so as to start a subsequent grinding operation from a position on said subsequent guide point.

11. A method of claim 10, wherein a force control of said grinder is exercised in a normal direction of the work while the grinding operation is started from said guide point and said subsequent guide point, and said grinder and the work are maintained in a non-contacting condition while effecting a return of the grinder to said guide point and said subsequent guide point.

12. A method of claim 10, wherein a force control of said grinder is exercised in a normal direction of the work while the grinding operation is started from said guide point and said subsequent guide point, and the force control of said grinder is exercised in a tangent direction of the work during a feeding grinding operation from said guide point and said subsequent guide point.

13. A method for controlling a grinder robot, comprising the steps of:

driving a grinder connected to said grinder robot;

pressing said grinder against a grinder region of a work;

controlling a pressing force of the grinder to have first and second boundary pressing force profiles and a constant pressing force between the first and second boundary pressing force profiles, wherein the first and second boundary pressing force profiles apply a smaller force than the constant pressing force.

14. A method of claim 13, wherein the first boundary pressing force profile increases from a first predetermined force value to the constant pressing force and the second boundary force profile decreases from the constant pressing force to a second predetermined force value.

15. A method of claim 14, wherein the first predetermined force value equals the second predetermined force value.

16. A method of claim 15, wherein the first and second predetermined force values are zero.

17. A method of claim 16, wherein the first boundary pressing force profile increases linearly from the first predetermined force value to the constant pressing force and the second boundary pressing force profile decreases linearly from the constant pressing force to the second predetermined force value.

18. A method of claim 14, wherein the first and second boundary pressing force profiles are in a form of quadratic curves.

19. A method of claim 14, wherein the first and second boundary pressing force profiles are in a form of triangular functions.

* * * * *